W. J. NESBITT.
HEEL CUTTER.
APPLICATION FILED JUNE 2, 1917.

1,259,433.

Patented Mar. 12, 1918.
2 SHEETS—SHEET 1.

Witness:

Inventor.
By
Attorney.

W. J. NESBITT.
HEEL CUTTER.
APPLICATION FILED JUNE 2, 1917.
1,259,433.
Patented Mar. 12, 1918.
2 SHEETS—SHEET 2.
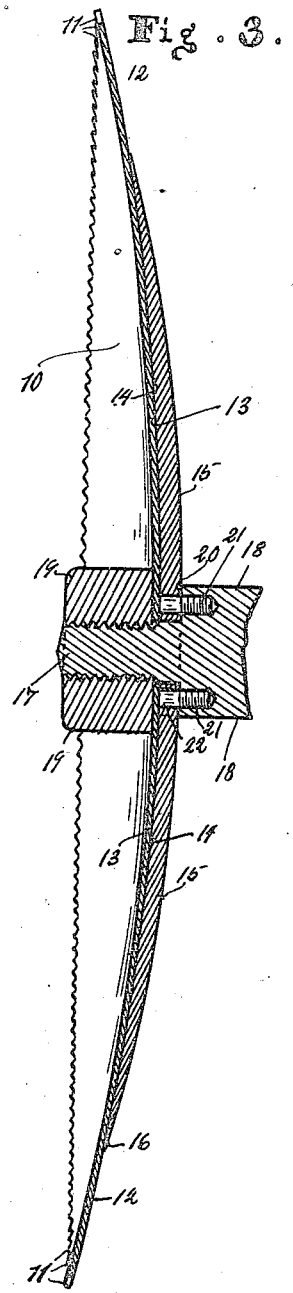
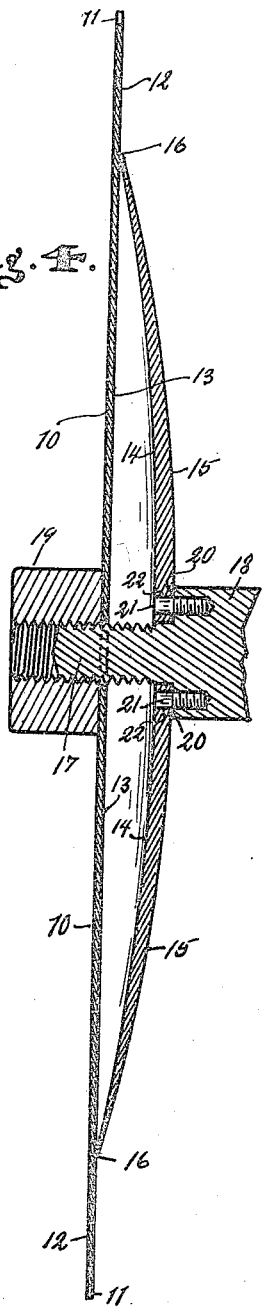
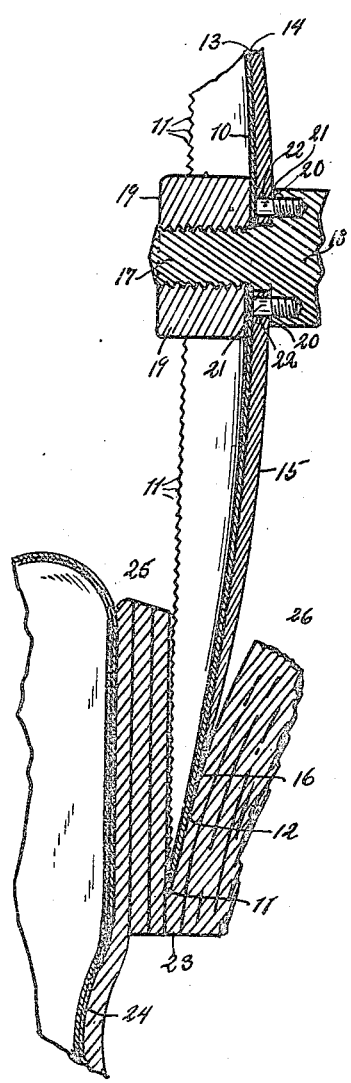

UNITED STATES PATENT OFFICE.

WILLIAM J. NESBITT, OF LOS ANGELES, CALIFORNIA.

HEEL-CUTTER.

1,259,433.

Specification of Letters Patent.

Patented Mar. 12, 1918.

Application filed June 2, 1917. Serial No. 172,537.

*To all whom it may concern:*

Be it known that I, WILLIAM J. NESBITT, a citizen of the United States of America, residing at Los Angeles, county of Los Angeles, State of California, have invented a certain new and useful Heel-Cutter; and I do hereby declare the following to be a full, clear, and exact description of the invention, such as will enable others skilled in the art to which it appertains to make and use the same.

This invention relates to a novel and improved cutter which is more particularly adapted for cutting the heels of shoes.

The main object of the invention is to make practical and efficient use of a comparatively thin circular saw for the work of cutting shoe heels.

A further object of the invention is to provide a novel and improved heel cutter which has a comparatively thin toothed cutting edge, and is formed to have its front face dished from the points of the teeth to its central portion, and to have its rear face abutting a stiffening plate which is gradually increased in thickness from the marginal portion of the cutter toward the central portion of the cutter.

Other objects and the advantages of the invention will be apparent to those skilled in the art from a careful consideration of the following description of the preferred construction embodying the invention, taken in connection with the accompanying drawings in which—

Figure 1:
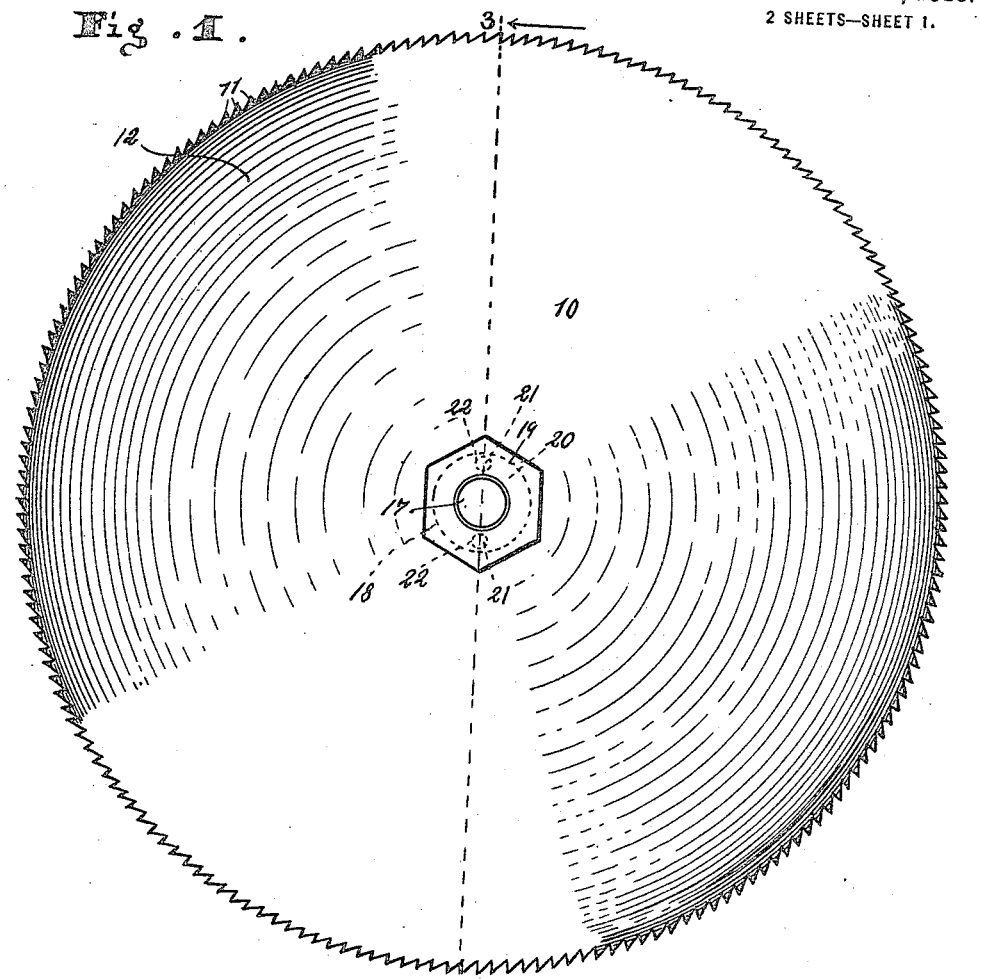
Figure 2:
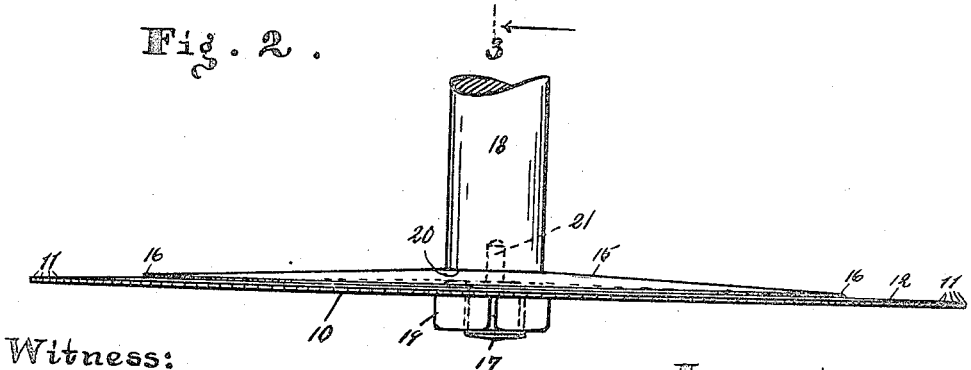

Figure 1 shows a front elevational view of the cutter; Fig. 2 shows a plan view of the same; Fig. 3 is an enlarged sectional view taken on the line 3—3 of Fig. 1; Fig. 4 shows the circular saw sprung away from the stiffening plate; and Fig. 5 is a broken sectional view showing the cutter and a partly cut heel of a shoe.

Referring to the drawings, the circular saw 10 is provided with the teeth 11 on its marginal portion 12, and it is of the type that is ordinarily used for sawing metal. In order to do effective work in cutting the leather and nails in the heel of a shoe the circular saw 10 is comparatively thin. The rear face 13 of the circular saw 10 abuts against the dished face 14 of the plate 15 which is of gradually reduced thickness from its central portion to its periphery 16 which latter is disposed adjacent to the marginal portion 12 of the circular saw 10. When the central portion of the circular saw 10 is forced or sprung against the dished face 14 of the plate 15, the front face of the circular saw 10 is dished from the points of the teeth 11 to the central portion of the circular saw 10, and the marginal portion 12 of the circular saw 10 is inclined forwardly. In use the plate 15 and the circular saw 10 preferably have their central portions fitted on the threaded reduced end portion 17 of the arbor 18, and a nut 19 on the reduced portion 17 is screwed up tightly against the front face of the circular saw 10 to cause the latter to make tight frictional contact with the front dished face 14 of the plate 15 which latter has its rear face bearing against the shoulder 20 on the arbor 18. The plate 15 is preferably locked in position on the arbor 18 by means of the pins 21 which extend forwardly from the shoulder 20 and fit in openings 22 in the central portion of the plate 15.

To do effective work in cutting through the leather and nails of the heel 23 of a shoe 24 it is necessary to use a comparatively thin circular saw 10. By dishing to the points of the teeth 11 the front face of the circular saw 10, only the points of the teeth 11 contact with the intact part 25 of the heel 23, see Fig. 5. It will be understood that unless the front face of the circular saw 10 is dished so that the marginal portion 12 of the circular saw 10 clears, and is out of contact with, the intact part 25 of the heel 23, the saw 10 will not cut in a straight line against the intact part 25 on account of the nails and uneven places in the leather of the heel which deflect the teeth 11 and the marginal portion 12 toward the slice 26 which is being cut off of the heel 23 and which in consequence bears with less resistance against the teeth 11 than does the intact part 25. The plate 15 stiffens the circular saw 10 and the marginal portion 12 is inclined forwardly so that the points of the teeth 11 are directed toward the intact part 25 of the heel 23 and the teeth 11 are adapted to spring back against the intact part 25 when they are deflected from said intact part. The teeth 11 in this instance requires little or no set and thus they all cut in the same path, and not in two side by side paths as do the teeth on circular saws now in use.

I claim:

1. A heel cutter comprising a comparatively thin circular saw which is provided with teeth on its marginal portion and has its front face dished from the points of the teeth to its central portion so that said marginal portion is inclined forwardly, and a plate in contact with the rear face of the circular saw, said plate having its periphery disposed adjacent to said marginal portion and being of gradually reduced thickness from its central portion to the periphery.

2. The combination of an arbor provided with a threaded reduced end portion and a shoulder, a plate having its central portion fitted on said reduced end portion and in contact with said shoulder, said plate having its front face dished and being of gradually reduced thickness from its central portion to its periphery, a comparatively thin circular saw fitted on said arbor, and a nut screwed on said reduced end portion whereby the central portion of the circular saw is forced into tight frictional contact with the dished front face of the plate so that the marginal portion of the circular saw is inclined forwardly as set forth.

In testimony whereof, I have signed my name to this specification at Los Angeles, county of Los Angeles, State of California, this 21st day of May A. D. 1917.

WILLIAM J. NESBITT.

Copies of this patent may be obtained for five cents each, by addressing the "Commissioner of Patents, Washington, D. C."